United States Patent
Park

(10) Patent No.: US 9,727,745 B2
(45) Date of Patent: Aug. 8, 2017

(54) DATA TRANSMITTING METHOD OF IMAGE FORMING APPARATUS AND IMAGE FORMING APPARATUS FOR PERFORMING DATA TRANSMITTING METHOD

(71) Applicant: Samsung Electronics Co., Ltd., Suwon-si (KR)

(72) Inventor: Hyun-wook Park, Suwon-si (KR)

(73) Assignee: S-PRINTING SOLUTION CO., LTD., Suwon-si (KR)

( * ) Notice: Subject to any disclaimer, the term of this patent is extended or adjusted under 35 U.S.C. 154(b) by 0 days.

(21) Appl. No.: 14/288,951

(22) Filed: May 28, 2014

(65) Prior Publication Data

US 2014/0268210 A1 Sep. 18, 2014

Related U.S. Application Data

(63) Continuation of application No. 12/431,173, filed on Apr. 28, 2009, now Pat. No. 8,773,705.

(30) Foreign Application Priority Data

Sep. 24, 2008 (KR) ........................ 10-2008-0093868

(51) Int. Cl.
*G06K 15/00* (2006.01)
*G06F 3/12* (2006.01)
*G06F 21/60* (2013.01)
*H04N 1/00* (2006.01)
(Continued)

(52) U.S. Cl.
CPC .......... *G06F 21/608* (2013.01); *G06F 3/1293* (2013.01); *H04N 1/0084* (2013.01); *H04N 1/00875* (2013.01); *H04N 1/3209* (2013.01); *H04N 1/32037* (2013.01);
(Continued)

(58) Field of Classification Search
None
See application file for complete search history.

(56) References Cited

U.S. PATENT DOCUMENTS 5,729,599 A * 3/1998 Plomondon .......... H04Q 3/0029
379/188
5,970,121 A 10/1999 Homayoun
(Continued)

FOREIGN PATENT DOCUMENTS

JP 2005-038372 2/2005

OTHER PUBLICATIONS

Korean Office Action issued Dec. 19, 2013 in Korean Patent Application No. 10-2013-0042430.
(Continued)

*Primary Examiner* — Madelein Nguyen
(74) *Attorney, Agent, or Firm* — Staas & Halsey LLP

(57) ABSTRACT

A method of transmitting data from an image forming apparatus, the method including: receiving identification information of a destination of the data; determining whether to transmit the data to the destination corresponding to the received identification information based on a security policy of the image forming apparatus; and transmitting the data to the destination in response to the destination being determined to be a destination to where the data is allowed to be transmitted, based on the security policy.

15 Claims, 8 Drawing Sheets

(51) Int. Cl.
  *H04N 1/32* (2006.01)
  *H04N 1/44* (2006.01)
(52) U.S. Cl.
  CPC ....... *H04N 1/32096* (2013.01); *H04N 1/4413* (2013.01); *H04N 1/4433* (2013.01)

(56) References Cited

U.S. PATENT DOCUMENTS

| | | | | |
|---|---|---|---|---|
| 6,248,996 | B1* | 6/2001 | Johnson | H04N 1/33307 250/208.1 |
| 6,335,927 | B1* | 1/2002 | Elliott et al. | 370/352 |
| 6,704,409 | B1* | 3/2004 | Dilip | H04M 3/523 379/243 |
| 6,710,897 | B1* | 3/2004 | Shimoyama | H04N 1/32037 358/440 |
| 6,738,462 | B1* | 5/2004 | Brunson | H04L 12/589 379/142.04 |
| 6,775,665 | B1* | 8/2004 | Piersol | |
| 6,775,691 | B1 | 8/2004 | Kubik et al. | |
| 6,909,708 | B1* | 6/2005 | Krishnaswamy et al. | 370/352 |
| 7,302,701 | B2* | 11/2007 | Henry | H04L 63/102 358/1.15 |
| 7,382,476 | B1* | 6/2008 | Maemura | H04N 1/32005 358/1.15 |
| 7,546,130 | B2* | 6/2009 | Vance | H04M 1/72544 379/903 |
| 7,752,277 | B2* | 7/2010 | Hyakutake | G06F 17/30011 358/1.12 |
| RE42,702 | E | 9/2011 | Cobb | |
| 8,184,316 | B2 | 5/2012 | Bouchard | |
| 8,184,346 | B2 | 5/2012 | Ozawa et al. | |
| 8,255,784 | B2 | 8/2012 | Masui | |
| 8,873,095 | B2* | 10/2014 | Selvaraj | H04L 43/0811 358/1.13 |
| 9,007,632 | B2* | 4/2015 | Selvaraj | H04N 1/00204 358/1.13 |
| 2001/0024289 | A1* | 9/2001 | Scott | H04N 1/00281 358/1.9 |
| 2001/0035977 | A1* | 11/2001 | Adler | H04N 1/00209 358/1.15 |
| 2001/0046064 | A1* | 11/2001 | Kulakowski et al. | 358/1.15 |
| 2003/0182379 | A1* | 9/2003 | Henry | H04L 51/28 709/206 |
| 2003/0214678 | A1* | 11/2003 | Shibata | H04L 12/5875 358/405 |
| 2004/0051912 | A1* | 3/2004 | Schlank | H04N 1/00204 358/468 |
| 2004/0054741 | A1 | 3/2004 | Weatherby et al. | |
| 2004/0075872 | A1 | 4/2004 | Adler et al. | |
| 2004/0078337 | A1* | 4/2004 | King et al. | 705/51 |
| 2004/0095612 | A1* | 5/2004 | Eguchi | H04N 1/00209 358/402 |
| 2004/0101142 | A1* | 5/2004 | Nasypny | 380/278 |
| 2004/0145660 | A1* | 7/2004 | Kusaka | H04N 1/32101 348/211.2 |
| 2004/0174570 | A1* | 9/2004 | Plunkett et al. | 358/3.13 |
| 2004/0199763 | A1 | 10/2004 | Freund | |
| 2004/0252323 | A1* | 12/2004 | Mimamino | H04N 1/00347 358/1.14 |
| 2004/0252338 | A1 | 12/2004 | Oomori | |
| 2005/0007624 | A1 | 1/2005 | Henry | |
| 2005/0012966 | A1* | 1/2005 | Mitchell | H04N 1/00912 358/440 |
| 2005/0018237 | A1* | 1/2005 | Cossel | H04N 1/00859 358/1.15 |
| 2005/0021980 | A1 | 1/2005 | Kanai | |
| 2005/0088689 | A1* | 4/2005 | Suga | H04N 1/00278 358/1.15 |
| 2005/0152334 | A1* | 7/2005 | Okamoto et al. | 370/351 |
| 2005/0193269 | A1* | 9/2005 | Haswell et al. | 714/38 |
| 2005/0275887 | A1* | 12/2005 | Yamanaka | 358/1.15 |
| 2006/0082822 | A1 | 4/2006 | Irons et al. | |
| 2006/0168075 | A1 | 7/2006 | Kitada et al. | |
| 2006/0268331 | A1* | 11/2006 | Fukunishi | G06F 21/608 358/1.15 |
| 2007/0024892 | A1* | 2/2007 | Cho | G06F 21/608 358/1.14 |
| 2007/0086023 | A1* | 4/2007 | Kadota | H04N 1/32064 358/1.1 |
| 2007/0121147 | A1* | 5/2007 | Corona | G06F 3/1206 358/1.15 |
| 2007/0127053 | A1* | 6/2007 | Tominaga | G06F 3/121 358/1.14 |
| 2007/0133034 | A1* | 6/2007 | Jindal | G06F 17/30867 358/1.14 |
| 2007/0171470 | A1* | 7/2007 | Fujii | H04N 1/00204 358/1.15 |
| 2007/0177194 | A1* | 8/2007 | Yamaguchi | H04N 1/0048 358/1.15 |
| 2007/0201086 | A1* | 8/2007 | Kim | H04L 12/58 358/1.15 |
| 2007/0201101 | A1* | 8/2007 | Corona | H04N 1/0035 358/400 |
| 2007/0211301 | A1* | 9/2007 | Hayashi | H04N 1/00795 358/404 |
| 2007/0223054 | A1 | 9/2007 | Endo | |
| 2007/0247670 | A1 | 10/2007 | Tomita et al. | |
| 2007/0250627 | A1* | 10/2007 | May | G06F 21/56 709/225 |
| 2007/0288254 | A1* | 12/2007 | Eisner | 705/1 |
| 2008/0002224 | A1* | 1/2008 | Tanimoto | H04N 1/00209 358/1.15 |
| 2008/0007791 | A1* | 1/2008 | Nagarajan | H04N 1/32619 358/402 |
| 2008/0007793 | A1 | 1/2008 | Filbrich et al. | |
| 2008/0024833 | A1 | 1/2008 | Kawasaki | |
| 2008/0062467 | A1 | 3/2008 | Rajput | |
| 2008/0178239 | A1* | 7/2008 | Yampanis | 725/110 |
| 2008/0189775 | A1* | 8/2008 | Fujita | G06F 21/34 726/7 |
| 2008/0204796 | A1* | 8/2008 | Kitamura et al. | 358/1.15 |
| 2008/0256346 | A1* | 10/2008 | Lee et al. | 712/239 |
| 2008/0297837 | A1* | 12/2008 | Soda | G06K 15/005 358/1.15 |
| 2009/0003856 | A1* | 1/2009 | Tanaka | H04N 1/00846 399/45 |
| 2009/0086278 | A1 | 4/2009 | Vendrow et al. | |
| 2009/0185221 | A1* | 7/2009 | Yabuki | G06F 21/34 358/1.15 |
| 2009/0323115 | A1* | 12/2009 | Van Bergen | G06Q 10/107 358/1.15 |
| 2009/0323116 | A1* | 12/2009 | Sekiguchi | H04L 12/5835 358/1.15 |
| 2010/0053676 | A1* | 3/2010 | Sugimoto | G06F 3/0238 358/1.15 |
| 2010/0141983 | A1* | 6/2010 | Sorrentino | G06F 3/1203 358/1.15 |
| 2010/0208723 | A1 | 8/2010 | Olafsson | |
| 2011/0013215 | A1* | 1/2011 | Yonezawa | G06F 3/121 358/1.14 |
| 2011/0075191 | A1* | 3/2011 | Meunier | G06Q 10/107 358/1.15 |
| 2011/0170136 | A1* | 7/2011 | Zakarian et al. | 358/1.15 |
| 2012/0182578 | A1 | 7/2012 | Endo | |
| 2012/0250065 | A1* | 10/2012 | Partridge | G06F 21/608 358/1.14 |
| 2012/0287471 | A1 | 11/2012 | Street, Jr. | |
| 2014/0168696 | A1* | 6/2014 | Matsuhara | H04N 1/00307 358/1.15 |
| 2014/0211260 | A1* | 7/2014 | Nebayashi | G06F 13/00 358/1.15 |

OTHER PUBLICATIONS

Korean Office Action for related Korean Patent Application No. 10-2008 0093868, mailed on Oct. 10, 2012.
Korean Office Action dated Feb. 15, 2013 in Korean Patent Application No. 10-2008-0093868.

(56) References Cited

OTHER PUBLICATIONS

Supplemental Notice of Allowability issued Apr. 8, 2014 in U.S. Appl. No. 12/431,173.
US Notice of Allowance issued Feb. 26, 2014 in U.S. Appl. No. 12/431,173.
Interview Summary issued Jan. 27, 2014 in U.S. Appl. No. 12/431,173.
US Office Action issued Sep. 13, 2013 in U.S. Appl. No. 12/431,173.
US Office Action issued Jan. 25, 2013 in U.S. Appl. No. 12/431,173.
First Action Interview Office Action Summary issued Oct. 22, 2012 in U.S. Appl. No. 12/431,173.
First Action Interview Pilot Program Pre-Interview Communication issued Jul. 23, 2012 in U.S. Appl. No. 12/431,173.
U.S. Appl. No. 12/431,173, filed Apr. 28, 2009, Hyun-wook Park, Samsung Electronics Co., LTD.
Korean Appeal Decision dated Sep. 23, 2014 in Korea Patent Application No. 10-2008-93868.

* cited by examiner

FIG. 3

```
STORE FTP Server ADDRESS LIST

Server IP Address and port : [ 10.90.194.55 ] [ 21 ] ——300

Login Name : [    aa    ] ——310

Login password : [ ******** ] ——320

[ Apply ]
```

FIG. 4

Warning: THE SERVER IS A TRANSMISSION BLOCK SERVER AND CANNOT BE STORED IN ADDRESS LIST. CONTACT PERSON IN CHARGE. ——400

CAUSE: SERVER VIOLATED IN-HOUSE SECURITY POLICY ——410

DATA TRANSMITTING METHOD OF IMAGE FORMING APPARATUS AND IMAGE FORMING APPARATUS FOR PERFORMING DATA TRANSMITTING METHOD

CROSS-REFERENCE TO RELATED APPLICATION

This application is a continuation of U.S. patent application Ser. No. 12/431,173, filed Apr. 28, 2009 in the United States Patent and Trademark Office. This application claims the priority benefit of U.S. patent application Ser. No. 12/431,173, filed Apr. 28, 2009 in the United States Patent and Trademark Office, and claims the priority benefit of Korean Patent Application No. 10-2008-93868, filed Sep. 24, 2008, in the Korean Intellectual Property Office, the disclosures of which are incorporated herein by reference.

BACKGROUND OF THE INVENTION

1. Field of the Invention

Aspects of the present general inventive concept relate to a method of transmitting data of an image forming apparatus and an image forming apparatus performing the data transmitting method.

2. Description of the Related Art

In general, an image forming apparatus is a device that performs operations of printing, copying, scanning, and/or faxing. Since such multiple operations are provided in an image forming apparatus due to the latest technology developments, the user can individually conduct printing, copying, faxing, scanning, etc., operations using the image forming apparatus, and then conduct various other operations according to user requirements (such as transmitting generated scan data of a scanning operation via e-mail or fax).

Recently, a network scan method that transmits an image file that is scanned by an image forming apparatus to a destination via a network has been frequently used. Examples of the currently used network scan method include: a Scan to File Transfer Protocol (FTP) method, in which a scanned image file is transmitted to an FTP server; a Scan to Server Message Block (SMB) method, in which a scanned image file is transmitted to a common folder of a PC; a Scan to e-mail method, in which a scanned image file is attached to an e-mail to be transmitted; and a Scan to Web-based Distributed Authoring and Versioning (WebDAV) method, in which a scanned image file is transmitted to a WebDAV server. When the network scan method is used, the image file scanned by the image forming apparatus can be easily transmitted to a destination via a network. However, since there is no restriction to the type of data transmission, documents that require security (such as confidential papers) might be easily leaked.

SUMMARY OF THE INVENTION

Aspects of the present general inventive concept provide a data transmission method of an image forming apparatus, in which a scanned image file is transmitted via a network and leakage of the transmitted data to the outside can be prevented during the transmission, and an image forming apparatus performing the method.

According to an aspect of the present general inventive concept, there is provided a method of transmitting data from an image forming apparatus, the method including: receiving identification information of a destination of the data; determining whether to transmit the data to the destination corresponding to the received identification information based on a security policy of the image forming apparatus; and transmitting the data to the destination in response to the destination being determined to be a destination to where the data is allowed to be transmitted based on the security policy.

According to another aspect of the present general inventive concept, there is provided a computer-readable recording medium having embodied thereon a program for executing the method of transmitting data of an image forming apparatus, on at least one computer.

According to another aspect of the present general inventive concept, there is provided an image forming apparatus to transmit data, the apparatus including: a first user interface unit to receive identification information of a destination of the data; a transmission possibility determining unit to determine whether the data is allowed be transmitted to the destination corresponding to the identification information received through the first user interface unit based on a security policy of the image forming apparatus; and a data transmission unit to transmit data if the transmission possibility determining unit determines the destination as a destination to where the data is allowed to be transmitted.

According to yet another aspect of the present invention, there is provided a method of implementing a security policy in an image forming apparatus, the method including: receiving one or more identification information of corresponding devices connected to the image forming apparatus; determining, for each of the one or more identification information, if the corresponding device is a destination to where data is allowed to be transmitted based on a security policy of the image forming apparatus; storing the corresponding identification information in an address list database, in the image forming apparatus, if the device is determined to be the destination to where the data is allowed to be transmitted.

According to still another aspect of the present invention, there is provided a method of transmitting data from an image forming apparatus, the method including: receiving a selection of identification information of a destination of the data, the identification information being selected from an address list database that stores one or more identification information of corresponding destinations to where data is allowed to be transmitted based on a security policy of the image forming apparatus; and transmitting the data to the destination.

According to another aspect of the present invention there is provided an image forming apparatus to implement a security policy, the apparatus including: a first user interface unit to receive one or more identification information of corresponding devices connected to the image forming apparatus; and an address list managing unit to determine, for each of the one or more identification information, if the corresponding device is a destination to where data is allowed to be transmitted based on a security policy of the image forming apparatus, and to store the corresponding identification information in an address list database if the device is determined to be the destination to where the data is allowed to be transmitted.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIG. 3 illustrates a user interface that receives identification information of a predetermined destination according to an embodiment of the present general inventive concept;

FIG. 4 is a schematic view illustrating a message that is displayed in operation 250 o f FIG. 2 according to an embodiment of the present general inventive concept;

DETAILED DESCRIPTION OF THE EMBODIMENTS

Figure 1:
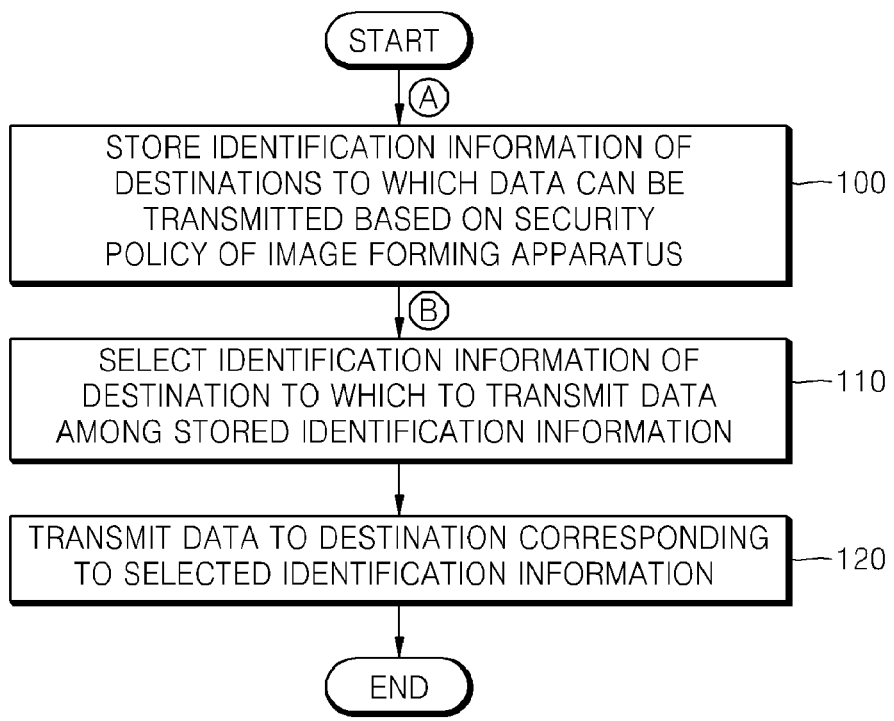
FIG. 1 is a flowchart illustrating a data transmission method of an image forming apparatus according to an embodiment of the present general inventive concept.

Reference will now be made in detail to the present embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a flowchart illustrating a data transmission method of an image forming apparatus according to an embodiment of the present general inventive concept. Referring to FIG. 1, identification information of destinations to where data can be transmitted is stored based on a security policy of an image forming apparatus in operation 100.

Figure 2:
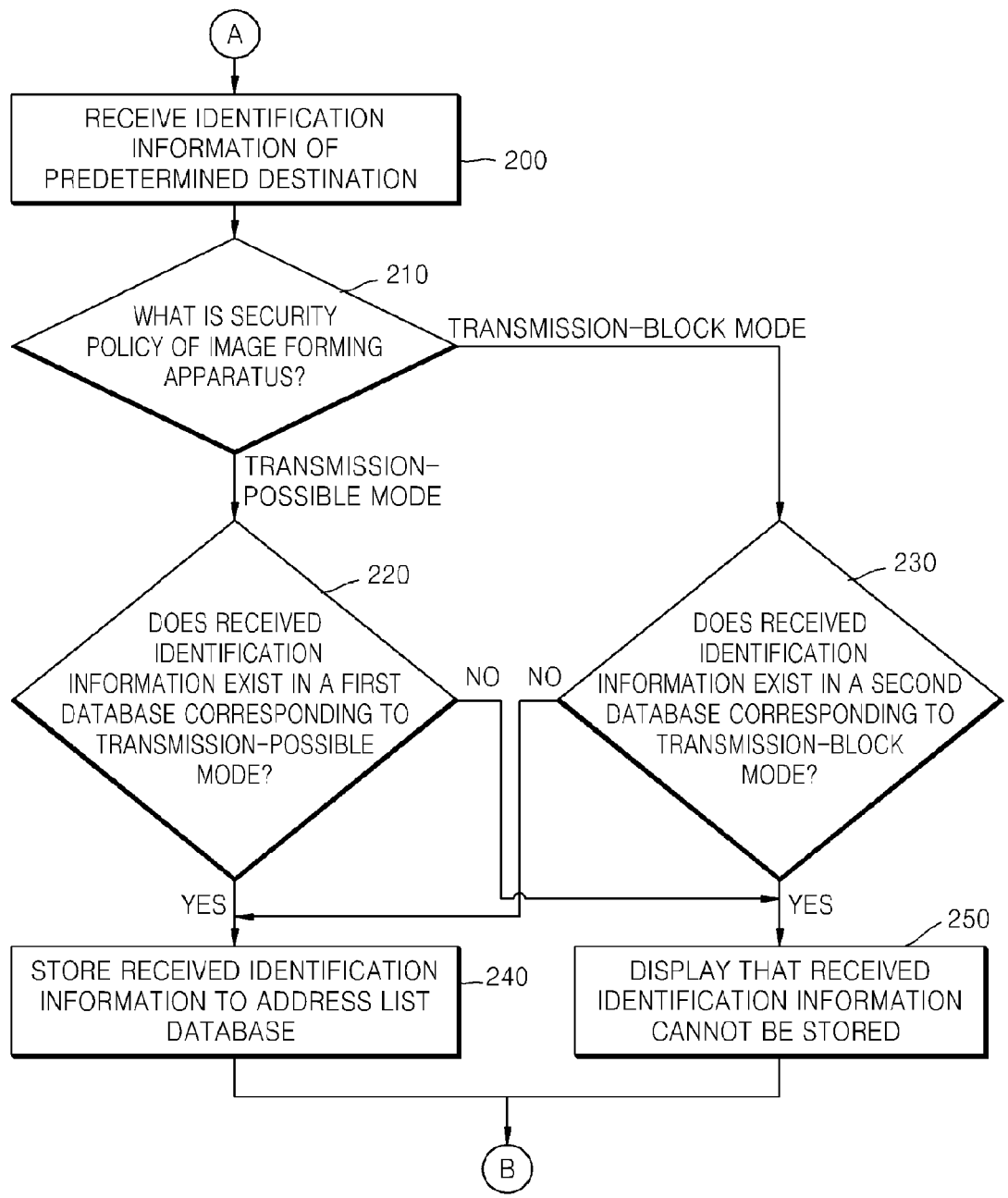
FIG. 2 is a detailed flowchart of an operation of storing destination identification information, of the method illustrated in FIG. 1.

FIG. 2 is a detailed flowchart of operation 100 of the method illustrated in FIG. 1. Hereinafter, the operation 100 of FIG. 1 will be described in detail with reference to FIG. 2. Referring to FIG. 2, identification information of a destination is received in operation 200. The identification information may be received through a user interface that receives user inputs of identification information of a destination. Here, a destination may be a host or a device that is connected to the image forming apparatus via a network. Examples of the host include a host PC, a management server, a storage server, etc. Moreover, the host may be a File Transfer Protocol (FTP server), a Web-based Distributed Authoring and Versioning (WebDAV) server, and/or a Simple Mail Transfer Protocol (SMTP) server. The device may be another image forming apparatus. Also, the identification information of the destination may be an Internet Protocol (IP) address of a server that is connected to the image forming apparatus via a network or the name of a device. That is, if the destination is a server, the IP address of the server may be received as the identification information, and if the destination is a device, the name of the device may be received as the identification information.

FIG. 3 illustrates a user interface that receives the identification information of a predetermined destination according to an embodiment of the present general inventive concept. The user interface illustrated in FIG. 3 is for a case in which the destination is an FTP server. As illustrated in FIG. 3, by receiving an IP address and information about a port 300 of the FTP server, and a login name 310 and a login password 320 for logging into the FTP server, the IP address of the FTP server (i.e., the destination) is received.

Referring back to FIG. 2, the security policy of the image forming apparatus is checked in operation 210. A security policy is used when transmitting data in the image forming apparatus according to aspects of the present general inventive concept. The security policy may include a transmission-possible mode, in which destinations to which data can be transmitted are designated, and/or a transmission-block mode, in which destinations to which data cannot be transmitted are designated. If the security policy of the image forming apparatus is the transmission-possible mode, the method proceeds to operation 220. Conversely, if the security policy of the image forming apparatus is the transmission-block mode, the method proceeds to operation 230.

Whether the received identification information exists in a first database corresponding to the transmission-possible mode is checked in operation 220. According to an aspect of the present general inventive concept, each of the security policies has a corresponding database such that identification information of destinations to which data can be transmitted is stored in the first database that corresponds to the transmission-possible mode. For example, the IP address of a server to which data can be transmitted, the name of a device, the range of the server IP address, etc. are stored in the first database. If the received identification information exists in the first database (operation 220), the method proceeds to operation 240. Conversely, if the received identification information does not exist in the first database (operation 220), the method proceeds to operation 250.

If the security policy of the image forming apparatus is the transmission-block mode (operation 210), whether the received identification information exists in a second database that corresponds to the transmission-block mode is checked in operation 230. In the second database corresponding to the transmission-block mode, identification information of destinations to which data transmission cannot be transmitted is stored. For example, the IP address of a server to which data cannot be transmitted, the name of a device, the range of the server IP address, etc. are stored in the second database. If the received identification information exists in the second database (operation 230), the method proceeds to operation 250. Conversely, if the received identification information does not exist in the second database (operation 230), the method proceeds to operation 240.

The received identification information is stored in an address list database in operation 240. The address list database, according to an aspect of the present general inventive concept, stores identification information of a destination where a security problem does not occur. When the received identification information exists in a first database that corresponds to the transmission-possible mode (operation 220) and/or does not exist in a second database that corresponds to the transmission-block mode (operation 230), a security problem does not occur when data is transmitted to the destination corresponding to the received identification information via a network. Accordingly, the received identification information is stored in the address list database in operation 240.

In contrast, a message indicating that the received identification information cannot be stored is output (for example, displayed) in operation 250. When the received identification information does not exist in the first database corresponding to the transmission-possible mode (operation 220) and/or exists in the second database corresponding to the transmission-block mode (operation 230), a security problem results when data is transmitted via a network to a destination corresponding to the received identification information. Accordingly, the received identification information is not stored in the address list database and a message is output to inform the user that the received identification information cannot be stored in operation 250.

FIG. 4 is a schematic view illustrating a message that is displayed in operation 250 of FIG. 2 according to an embodiment of the present general inventive concept. As illustrated in FIG. 4, in operation 250, a message including details 400 that the received identification information cannot be stored and a cause 410 therefore are displayed together. While the present embodiment displays a message that the received identification information cannot be stored, it is understood that aspects of the present general inventive concept are not limited thereto. For example, according to other aspects, a message indicating that data cannot be transmitted may be output, or a light and/or sound may be output to indicate that the identification information cannot be stored.

Referring back to FIG. 1, identification information of a destination to where data is to be transmitted is selected from the stored identification information in operation 110. In the data transmission method of FIG. 1, when data is transmitted to a destination corresponding to identification information stored in an address list database, no security problem results. Accordingly, identification information of a destination to where data is to be transmitted can be selected from among a plurality of identification information of destinations, which may be stored as the IP address, the name of a device, the range of the IP address, etc.

Data is transmitted to the destination corresponding to the selected identification information in operation 120. If the selected identification information is an IP address, data is transmitted to a server corresponding to the IP address. While scan data scanned in the image forming apparatus is described as an example of the data to be transmitted, it is understood that aspects of the present general inventive concept are not limited thereto, and any data stored in the image forming apparatus can be transmitted.

Figure 5:
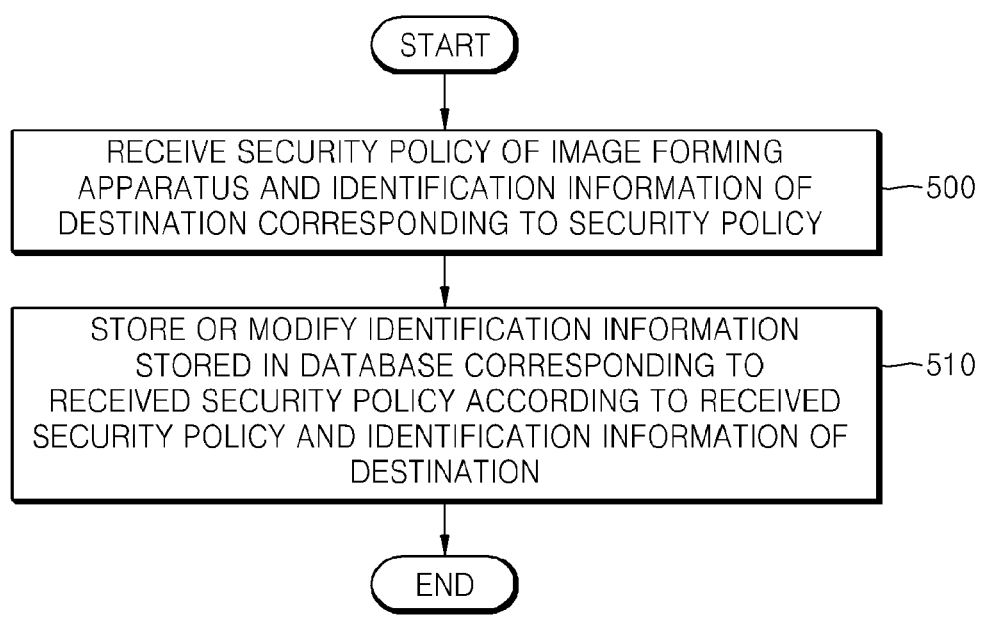
FIG. 5 is a flowchart illustrating a method of receiving a security policy according to an embodiment of the present general inventive concept.

FIG. 5 is a flowchart illustrating a method of receiving a security policy according to an embodiment of the present general inventive concept. The security policy of the image forming apparatus may be received before transmitting data to, or generating data in, the image forming apparatus or when the security policy of the image forming apparatus is modified.

Referring to FIG. 5, the security policy of the image forming apparatus and identification information of a destination corresponding to the security policy are received in operation 500. As described above, since the transmission-possible mode, in which destinations that allow network access are designated, and a transmission-block mode, in which destinations that block network access are designated, are used in the data transmission method of the image forming apparatus according to the current embodiment, the security policy of either the transmission-possible mode or the transmission-block mode is received.

Figure 6:
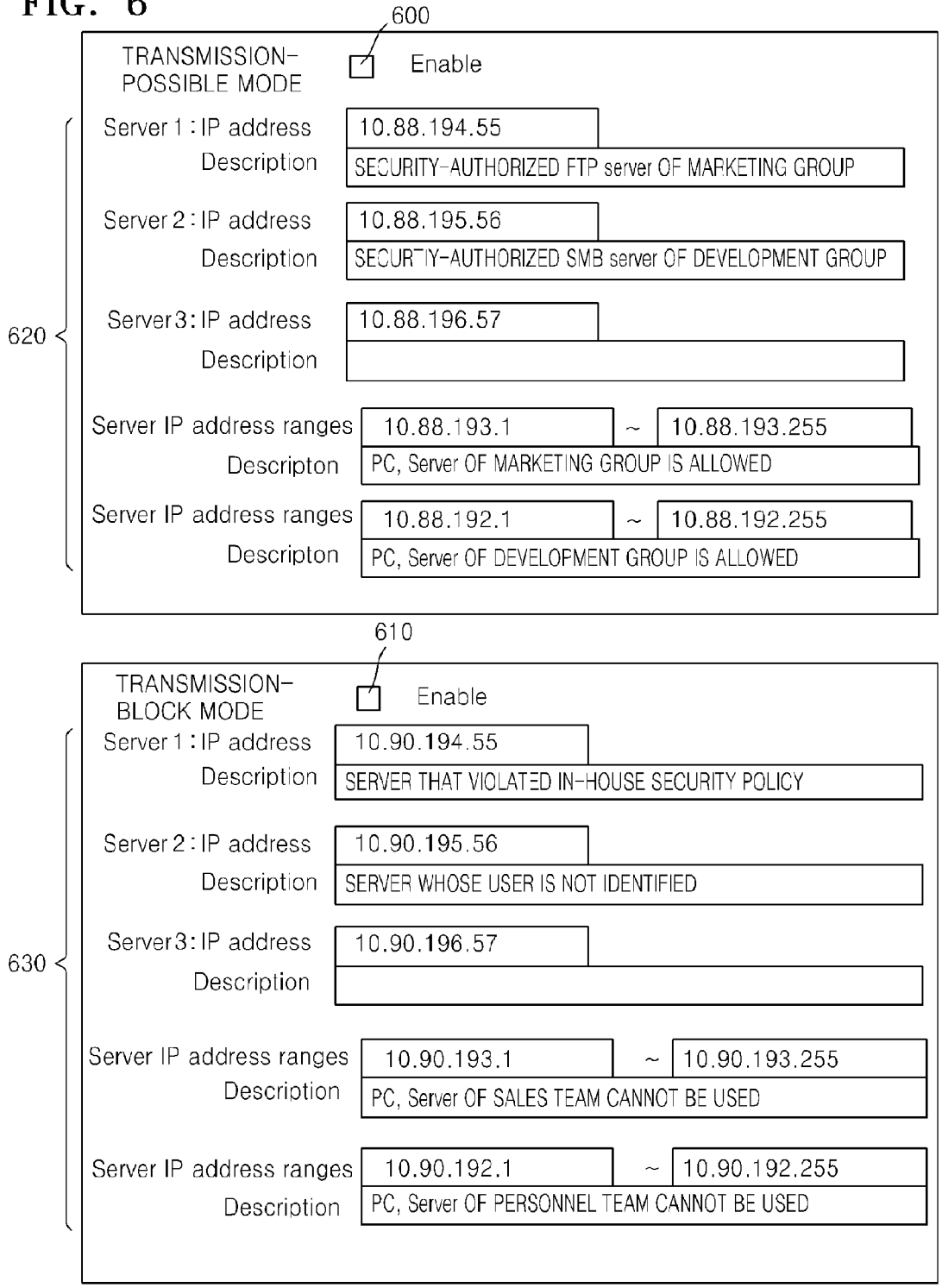
FIG. 6 illustrates a user interface to receive a security policy according to an embodiment of the present general inventive concept.

FIG. 6 illustrates a user interface to receive a security policy according to an embodiment of the present general inventive concept. Referring to FIG. 6, one of a transmission-possible mode 600 and a transmission-block mode 610 is enabled (operation 500 in FIG. 5) in the user interface, and identification information 620 or 630 of a destination according to the security policy is received. The identification information of the destination may be the address of a server and/or the range of the server address Furthermore, an explanation (i.e., description) corresponding to the address of the server or the range of the server address may also be included. Also, the user interface may be realized in a local panel of the image forming apparatus, though aspects of the present general inventive concept are not limited thereto. For example, according to other aspects, the user interface may also (or alternatively) be realized in an embedded web server of the image forming apparatus.

Referring back to FIG. 5, the identification information stored in the database corresponding to the received security policy is stored or modified according to the received security policy and the identification information of the destination in operation 510. For example, when the transmission-possible mode 600 is enabled in the user interface of FIG. 6 and the transmission-possible mode 600 is received as the security policy, the received identification information 620 is stored in a first database corresponding to the transmission-possible mode. If identification information is already stored in the first database and the stored identification information is not identical to the received identification information, the stored identification information in the first database may be modified to the received identification information, or the received identification information may be added to the first database. Also, the identification information stored in the address list database may also be modified according to the modification of the identification information of the first database.

Figure 7:
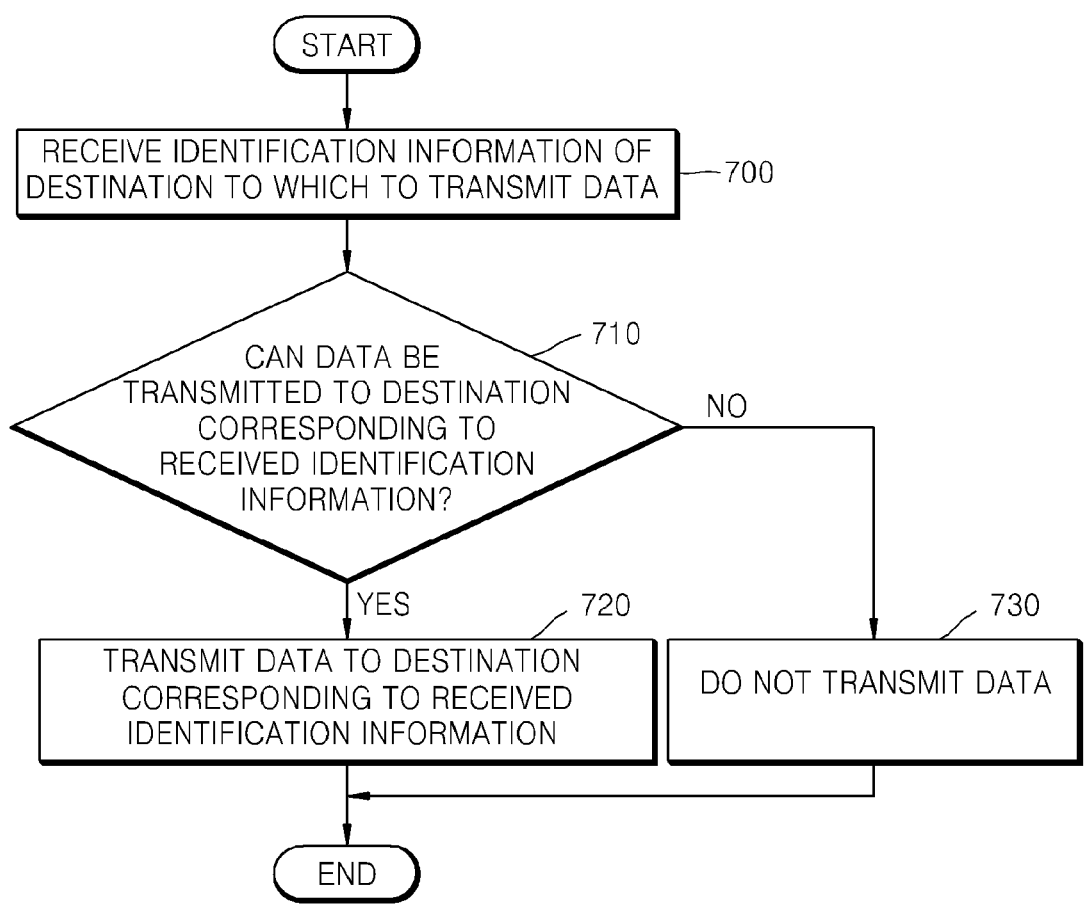
FIG. 7 is a flowchart illustrating a data transmission method conducted in an image forming apparatus according to another embodiment of the present general inventive concept.

FIG. 7 is a flowchart illustrating a data transmission method conducted in an image forming apparatus according to another embodiment of the present general inventive concept. Referring to FIG. 7, the identification information of a destination to where data is to be transmitted is received in operation 700. The identification information may be received via the user interface of FIG. 3. For example, when the destination to where data is to be transmitted is an FTP server, the IP address of the FTP server may be received via the user interface of FIG. 3.

Then, whether the destination corresponding to the received identification information is a destination to where data can be transmitted is determined based on the security policy of the image forming apparatus in operation 710. When the security policy of the image forming apparatus is the transmission-possible mode, and the received identification information exists in the first database, the destination corresponding to the received identification information is determined as a destination to where data can be transmitted. For example, when a server IP address of "10.90.194.55" is received via the user interface of FIG. 3, and the server IP address "10.90.194.55" is stored in the first database, the server having the IP address "10.90.194.55" is determined as a server to which data can be transmitted. On the other hand, when the received server IP address does not exist in the first database, the server corresponding to the server IP address is determined as a server to which data cannot be transmitted.

Conversely, when the security policy of the image forming apparatus is the transmission-block mode, and the received identification information does not exist in the second database, the destination corresponding to the received identification information is determined as a destination to which data can be transmitted. For example, when a server IP address of "10.90.194.55" is received via the user interface illustrated in FIG. 3 and the server IP address "10.90.194.55" is not stored in the second database, the server having the IP address "10.90.194.55" is determined as a server to which data can be transmitted. On the other hand, when the received server IP address exists in the second database, the server corresponding to the received server IP address is determined as a server to which data cannot be transmitted. When the server is determined as a destination to which data can be transmitted, the method proceeds to operation 720. However, when the server is determined as a destination to which data cannot be transmitted, the method proceeds to operation 730.

When the destination is determined to be a destination to where data can be transmitted (operation 710), data is transmitted to the destination corresponding to the received identification information in operation 720. For example, when the received identification information is an IP address, data is transmitted to a server corresponding to the IP address. The data may be scan data, or any other data stored in or generated by the image forming apparatus.

When the destination is determined to be a destination to where data cannot be transmitted (operation 710), data is not transmitted in operation 730. In this case, a message saying that data cannot be transmitted may be displayed.

Figure 8:
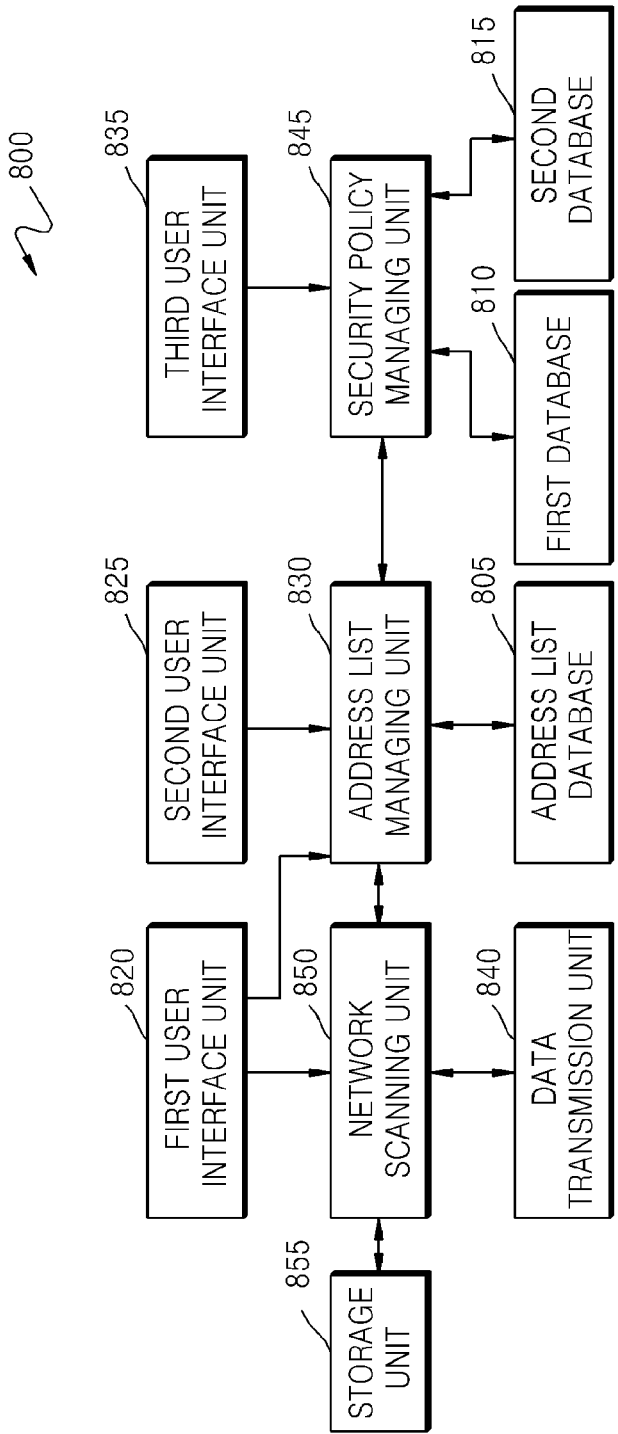
FIG. 8 is a block diagram illustrating an image forming apparatus transmitting data according to an embodiment of the present general inventive concept.

FIG. 8 is a block diagram illustrating an image forming apparatus 800 transmitting data according to an embodiment of the present general inventive concept. Referring to FIG. 8, the image forming apparatus 800 includes an address list database 805, a first database 810, a second database 815, a first user interface unit 820, a second user interface unit 825, an address list managing unit 830, a third user interface unit 835, a data transmission unit 840, a security policy managing unit 845, a network scanning unit 850, and a storage unit 855.

The address list database 805 stores identification information of destinations to where data can be transmitted (i.e., is allowed to be transmitted) based on the security policy of the image forming apparatus 800. That is, the image forming apparatus 800 transmits data using one or more security policies (for example, a transmission-possible mode, in which destinations that allow network access are designated, and a transmission-block mode, in which destinations that block network access are designated).

The first database 810 corresponds to the transmission-possible mode from the security policy of the image forming apparatus 800, and stores identification information of destinations to which data can be transmitted. For example, the first database 810 stores the IP address of a server to which data can be transmitted, the name of a device, the range of the server IP address, etc.

The second database 815 corresponds to the transmission-block mode from the security policy of the image forming apparatus 800, and stores identification information of destinations to which data cannot be transmitted. For example, the second database 815 stores the IP address of a server to which data cannot be transmitted, the name of a device, the range of the server IP address, etc.

The second user interface unit 825 receives identification information of predetermined destinations. In detail, identification information of predetermined destinations may be received via the user interface illustrated in FIG. 3. For example, when the destination is a server that is connected to the image forming apparatus 800 via a network, the IP address of the server is received.

The address list managing unit 830 compares identification information received through the second user interface unit 825 with identification information stored in the first database 810 and/or the second database 815, and stores the received identification information in the address list database 805 based on the comparison. In detail, when the security policy of the image forming apparatus is the transmission-possible mode, and the received identification information exists in the first database 810, the address list managing unit 830 stores the received identification information in the address list database 805. Similarly, when the security policy of the image forming apparatus is the transmission-block mode, and the received identification information does not exist in the second database 815, the address list managing unit 830 stores the input identification information in the address list database 805. Accordingly, when data is transmitted, identification information of the destinations where a security problem does not occur is stored in the address list database 805. However, it is understood that aspects of the present general inventive concept are not limited thereto. For example, according to other aspects, the address list database 805 stores identification information of the destinations where a security problem does occur.

The first user interface unit 820 receives identification information of a destination to where data is to be transmitted, from the identification information stored in the address list database 805. For example, when the destination is a server that is connected to the image forming apparatus 800 via a network, the IP address of the server is received.

The data transmission unit 840 transmits data to a destination corresponding to the identification information that is received through the first user interface unit 820. When the IP address of a server is input through the first user interface unit 820, the data transmission unit 840 transmits data to the server having the input IP address. As an example, the data transmission unit 840 transmits scan data generated by the network scanning unit 850 or data stored in the storage unit 855 to the server having the IP address that is received through the first user interface unit 820.

The third user interface unit 835 receives the security policy of the image forming apparatus 800 and identification information of a destination corresponding to the security policy. As an example, through the user interface illustrated in FIG. 6, the transmission-possible mode or the transmission-block mode is enabled, and identification information of a destination corresponding to the enabled security policy is received. That is, when the transmission-possible mode is enabled, the transmission-possible mode is selected, and when the transmission-block mode is enabled, the transmission-block mode is selected. The third user interface unit 835 may be realized in a local panel of the image forming apparatus 800 and/or in an embedded web server of the image forming apparatus 800.

The security policy managing unit 845 stores identification information in the first database 810 or in the second database 815 or modifies the stored identification information according to the security policy and the identification information that are received through the third user interface unit 835. For example, when the transmission-possible mode is received (or enabled) through the third user interface unit 835, and the received identification information is not stored in the first database 810, the security policy managing unit 845 stores the received identification information in the first database 810. On the other hand, when the transmission-block mode is received through the third user interface unit 835, and identification information different from the received identification information is stored in the second database 815, the identification information stored in the second database 815 is modified to the received identification information.

In the image forming apparatus 800 transmitting data according to the current embodiment, the first user interface unit 820, the second user interface unit 825, and the third user interface unit 835 are described as being different from one another. However, according to other embodiments, the first user interface unit 820, the second user interface unit 825, and/or the third user interface unit 835 may be realized as a single interface unit.

Figure 9:
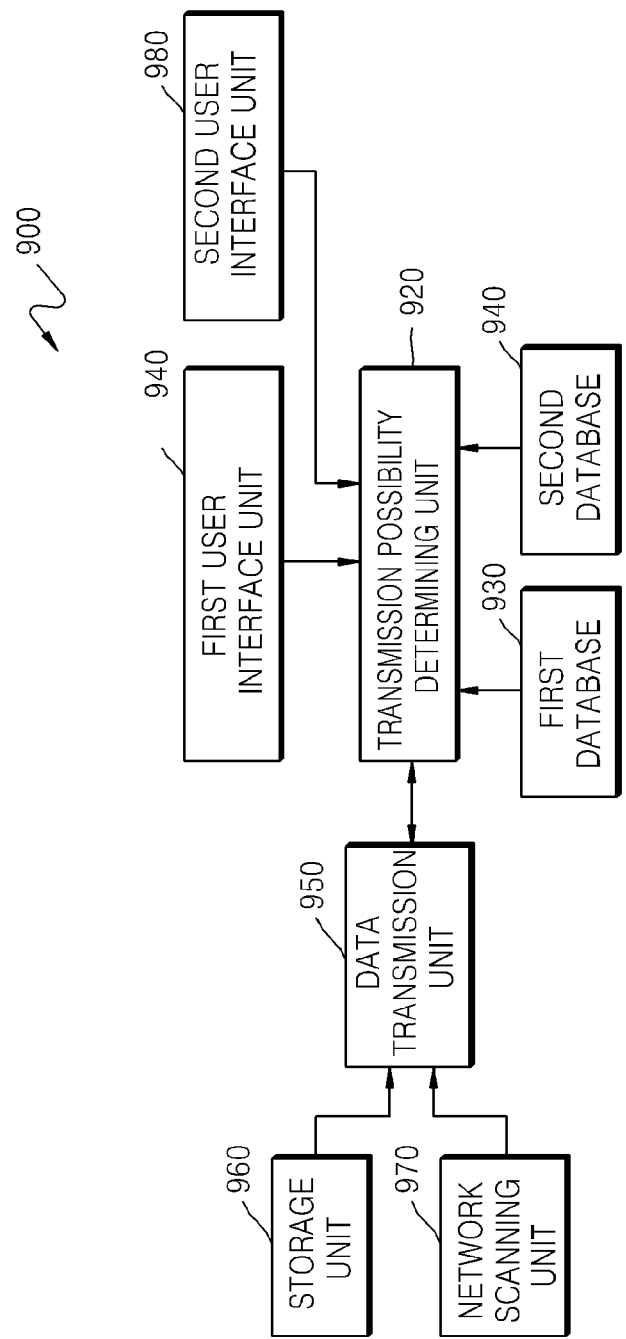
FIG. 9 is a block diagram illustrating an image forming apparatus transmitting data according to another embodiment of the present general inventive concept.

FIG. 9 is a block diagram illustrating an image forming apparatus 900 transmitting data according to another aspect of the present general inventive concept. Referring to FIG. 9, the image forming apparatus 900 includes a first user interface unit 910, a transmission possibility determining unit 920, a first database 930, a second database 940, a data transmission unit 950, a storage unit 960, a network scanning unit 970, and a second user interface unit 980.

The first user interface unit 910 receives identification information of at least one destination to where data is to be transmitted. The transmission possibility determining unit 920 determines whether data can be transmitted to a destination corresponding to the identification information received through the first user interface unit 910, based on the security policy of the image forming apparatus 900. The security policy of the image forming apparatus 900 may include a transmission-possible mode, in which destinations that allow network access are designated, and a transmission-block mode, in which destinations that block network access are designated. Thus, the transmission possibility determining unit 920 determines whether data can be transmitted according to whether the received identification information of the destination exists in a database corresponding to the security policy. The first database 930 corresponds to the transmission-possible mode from the security policy of the image forming apparatus 900, and stores identification information of destinations to which data can be transmitted. In contrast, the second database 940 corresponds to the transmission-block mode from the security policy of the image forming apparatus 900, and stores identification information of destinations to which data cannot be transmitted. In the current embodiment, the first database 930 and the second database 940 are separate. According to other embodiments, the first and second databases 930 and 940 may be realized as a single database.

In detail, when the security policy of the image forming apparatus 900 is the transmission-possible mode and identification information received through the first user interface unit 910 exists in the first database 930, the transmission possibility determining unit 920 determines the corresponding destination as a destination to where data can be transmitted. Similarly, when the security policy of the image forming apparatus is the transmission-block mode, and the identification information received through the first user interface unit 910 does not exist in the first database 930, the transmission possibility determining unit 920 determines the corresponding destination as a destination to where data can be transmitted.

The data transmission unit 950 transmits data to the destination that is determined as a destination to where data can be transmitted. The data transmission unit 950 may transmit data stored in the storage unit 960 or scan data generated by the network scanning unit 970.

The second user interface unit 980 receives the security policy of the image forming apparatus 900 and identification information of a destination corresponding to the security policy. Thus, when the security policy and the identification information of a destination corresponding to the security policy are received, identification information is stored in a database corresponding to the security policy, or is modified according to the received information.

While the image forming apparatus 900 transmitting data, the first user interface unit 910 and the second user interface unit 980 are described as separate in the current embodiment, it is understood that the first user interface unit 910 and the second user interface unit 980 may be realized as a single interface unit in other embodiments.

While not restricted thereto, aspects of the present general inventive concept can also be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CO-ROMs, magnetic tapes, floppy disks, and optical data storage devices. The computer-readable recording medium can also be distributed over network-coupled computer systems so that the computer-readable code is stored and executed in a distributed fashion. Aspects of the present general inventive concept may also be realized as a data signal embodied in a carrier wave and comprising a program readable by a computer and transmittable over the Interne.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method comprising:
   by an image forming apparatus:
      receiving identification information indicating a destination to which to transmit data by the image forming apparatus;
      checking whether a security policy of the image forming apparatus is in a transmission-possible mode in which destinations to where data is allowed to be transmitted are designated, or a transmission-block mode in which destinations to where data is not allowed to be transmitted are designated;
      when the checking indicates that the security policy is in the transmission-possible mode,
         checking stored information indicating the destinations to where data is allowed to be transmitted, to determine whether the destination indicated by the identification information is included in stored information indicating the destinations to where data is allowed to be transmitted, and
         when it is determined that the destination indicated by the identification information is included in stored information indicating the destinations to where data is allowed to be transmitted, allowing the image forming apparatus to transmit scan data generated by the image forming apparatus to the destination indicated by the received identification information;

when the checking indicates that the security policy is in the transmission-block mode,
checking stored information indicating the destinations to where data is not allowed to be transmitted, to determine whether the destination indicated by the identification information is included in stored information indicating the destinations to where data is not allowed to be transmitted, and
when it is determined that the destination indicated by the identification information is included in stored information indicating the destinations to where data is not allowed to be transmitted, preventing the image forming apparatus from setting for transmitting scan data generated by the image forming apparatus to the destination indicated by the received identification information.

2. The method as claimed in claim 1, wherein:
the stored information indicating the destinations to where data is allowed to be transmitted is stored in a first database, and
the stored information indicating the destinations to where data is not allowed to be transmitted is stored in a second database separate from the first database.

3. The method as claimed in claim 1, wherein:
when the checking whether the security policy is in the transmission-possible mode or the transmission-block mode indicates that the security policy is in the transmission-block mode and it is determined that the destination indicated by the identification information is not included in stored information indicating the destinations to where data is not allowed to be transmitted, allowing the image forming apparatus to transmit scan data generated by the image forming apparatus to the destination indicated by the received identification information.

4. The method as claimed in claim 1, wherein the destination is another image forming apparatus or a host device connected to the image forming apparatus via a network.

5. The method as claimed in claim 1, further comprising: by the image forming apparatus:
receiving the security policy and database identification information corresponding to the security policy; and
modifying identification information stored in a database that corresponds to the received security policy according to the received database identification information.

6. The method as claimed in claim 5, wherein the receiving of the security policy comprises receiving the security policy through a user interface of a local panel of the image forming apparatus or a host device that is connected to the image forming apparatus.

7. The method as claimed in claim 1, wherein, when the checking whether the security policy is in the transmission-possible mode or the transmission-block mode indicates that the security policy is in the transmission-possible mode and it is determined that the destination indicated by the identification information is not included in stored information indicating the destinations to where data is allowed to be transmitted,
preventing the image forming apparatus from setting for transmitting scan data generated by the image forming apparatus to the destination indicated by the received identification information.

8. The method as claimed in claim 1, further comprising:
when the checking indicates that the security policy is in the transmission-block mode and it is determined that the destination indicated by the identification information is included in stored information indicating the destinations to where data is not allowed to be transmitted, displaying a message indicating that scan data generated by the image forming apparatus cannot be transmitted.

9. A non-transitory computer-readable recording medium having embodied thereon a program to execute the method of claim 1 on at least one computer.

10. An image forming apparatus comprising:
at least one memory storing instructions; and
at least one processor that executes the instructions to cause the following to be performed by the image forming apparatus:
receiving identification information indicating a destination to which to transmit data by the image forming apparatus;
checking whether a security policy of the image forming apparatus is in a transmission-possible mode in which destinations to where data is allowed to be transmitted are designated, or a transmission-block mode in which destinations to where data is not allowed to be transmitted are designated;
when the checking indicates that the security policy is in the transmission- possible mode,
checking stored information indicating the destinations to where data is allowed to be transmitted, to determine whether the destination indicated by the identification information is included in stored information indicating the destinations to where data is allowed to be transmitted, and
when it is determined that the destination indicated by the identification information is included in stored information indicating the destinations to where data is allowed to be transmitted, allowing the image forming apparatus to transmit scan data generated by the image forming apparatus to the destination indicated by the received identification information;
when the checking indicates that the security policy is in the transmission-block mode,
checking stored information indicating the destinations to where data is not allowed to be transmitted, to determine whether the destination indicated by the identification information is included in stored information indicating the destinations to where data is not allowed to be transmitted, and
when it is determined that the destination indicated by the identification information is included in stored information indicating the destinations to where data is not allowed to be transmitted, preventing the image forming apparatus from setting for transmitting scan data generated by the image forming apparatus to the destination indicated by the received identification information.

11. The image forming apparatus as claimed in claim 10, wherein the at least one processor executes the instructions to cause the following to be further performed by the image forming apparatus:
when the checking whether the security policy is in the transmission-possible mode or the transmission-block mode indicates that the security policy is in the transmission-block mode and it is determined that the destination indicated by the identification information is not included in stored information indicating the destinations to where data is not allowed to be transmitted, allowing the image forming apparatus to transmit scan data generated by the image forming apparatus to the destination indicated by the received identification information.

12. The image forming apparatus as claimed in claim 10, wherein the destination is another image forming apparatus or a host device that is connected to the image forming apparatus via a network.

13. The image forming apparatus as claimed in claim 10, wherein the at least one processor executes the instructions to cause the following to be further performed by the image forming apparatus:
receiving the security policy and database identification information of a destination corresponding to the security policy; and
modifying identification information stored in a database corresponding to the received security policy according to the received database identification information.

14. The image forming apparatus as claimed in claim 10, wherein the at least one processor executes the instructions to cause the following to be further performed by the image forming apparatus:
when the checking whether the security policy is in the transmission-possible mode or the transmission-block mode indicates that the security policy is in the transmission-possible mode and it is determined that the destination indicated by the identification information is not included in stored information indicating the destinations to where data is allowed to be transmitted, preventing the image forming apparatus from setting for transmitting scan data generated by the image forming apparatus to the destination indicated by the received identification information.

15. The image forming apparatus as claimed in claim 10, wherein the at least one processor executes the instructions to cause the following to be further performed by the image forming apparatus:
when the checking indicates that the security policy is in the transmission-block mode and it is determined that the destination indicated by the identification information is included in stored information indicating the destinations to where data is not allowed to be transmitted, displaying a message indicating that scan data generated by the image forming apparatus cannot be transmitted.

\* \* \* \* \*